March 24, 1964  B. D. WEINBERG  3,126,166
ELECTRIC MOTOR DRIVE FOR FISHING REEL
Filed Dec. 11, 1962
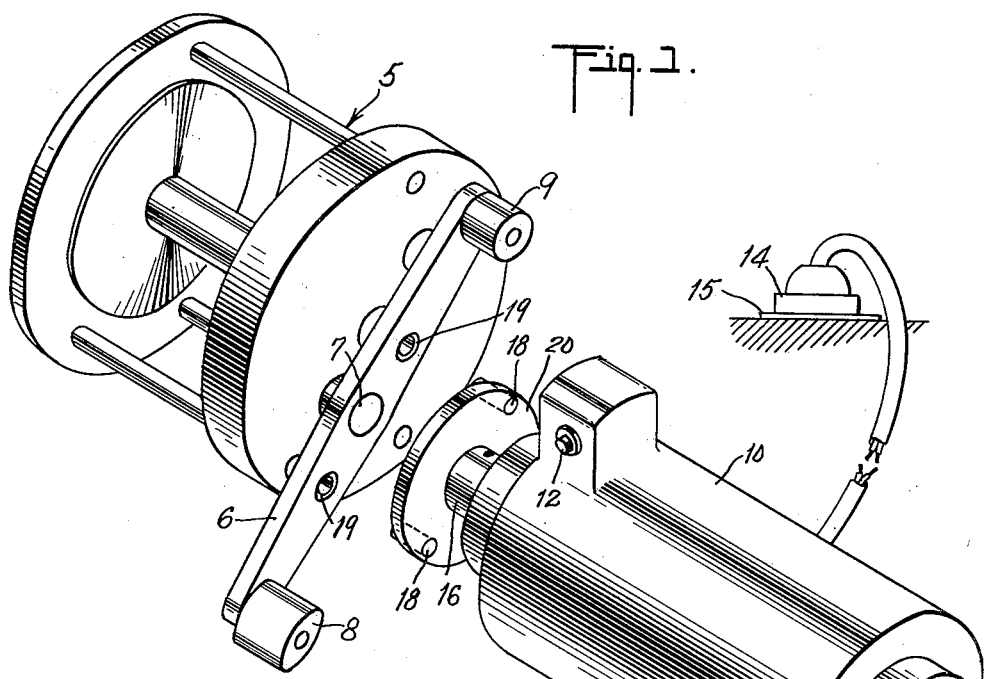
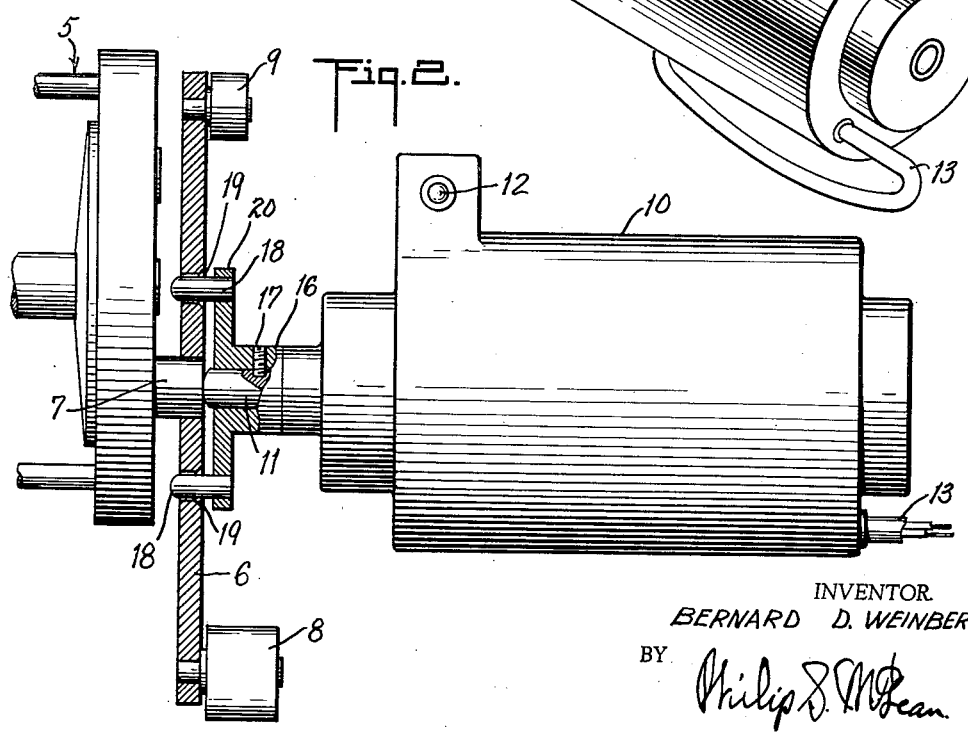
INVENTOR.
BERNARD D. WEINBERG
BY
ATTORNEY

United States Patent Office 3,126,166
Patented Mar. 24, 1964

3,126,166
ELECTRIC MOTOR DRIVE FOR A FISHING REEL
Bernard D. Weinberg, 235 W. Merrick Road,
Freeport, N.Y.
Filed Dec. 11, 1962, Ser. No. 243,868
1 Claim. (Cl. 242—84.1)

The invention herein disclosed relates to the powering of long line reels such as used in deep sea fishing.

Objects of the invention have been to provide a motor unit for driving the reel, particularly for retrieving the lines and which could be instantly shifted to any reel requiring such servicing.

Under such circumstances a single power unit may be capable of meeting the needs of all of a group of several fishermen.

Particular objects of the invention have been to make the power unit in a simple, compact form which could be readily handed about and used alternatively by different individuals.

Further special objects of the invention have been to provide the drive unit in a form which would not require modification of the reel structure and which would be instantly operable to drive all reels presently in use, more or less conventional in design.

Other special objects of the invention have been to provide an instantly engageable type of coupling for connecting the drive unit with the reel, operable by just positioning the unit in contact with the reel and instantly releasable by simply removing the unit from the reel.

It has also been an object of this invention to provide a drive unit embodying all such features and advantages, in a thoroughly practical, relatively inexpensive and attractive form.

Other desirable objects and the novel features of construction, combination and relation of parts through which the purposes of the invention are achieved are set forth and will appear in the course of the following specification.

The drawing accompanying and forming part of the specification illustrates a present practical embodiment of the invention. Structure however may be modified and changed as regards the immediate illustration, all within the true intent and scope of the invention hereinafter defined and claimed.

FIG. 1 is a perspective view illustrating the power unit as about to be applied to a fishing reel of more or less conventional design.

FIG. 2 is a plan view showing the driving unit temporarily coupled to the reel, portions broken away and appearing in section.

In the illustration a reel of more or less conventional design is indicated at 5, having the usual hand crank in the form of a lever 6 fixed on the reel shaft 7 and having a finger handle grip 8 at one end and a counterweight 9 at the opposite end.

The drive unit is shown as consisting of a geared motor 10 of small proportions, operating a drive shaft 11 and controlled by a conveniently located pushbutton or equivalent switch 12.

The motor is shown as supplied with current by flexible cord connection 13 terminating in plug 14 engageable with supply outlet 15 but in alternative forms of the invention the supply source may be combined with the motor as by means of a built in nickel-cadmium rechargeable storage battery or the like.

An essential part of the power drive unit is an instantly cooperable and separable form of coupling which will take hold of the reel by the simple act of engagement and which conversely will let go of the reel by the simple act of removal.

In the illustration this separable coupling device is shown as a collar 16 fixed on the motor driven shaft 11 by set screw 17 and carrying a pair of projecting pins 18 spaced to opposite sides of the shaft center, for engagement with the crank lever of the reel.

In the illustration the lever 6 is shown provided with openings 19, spaced to opposite sides of the reel shaft 7 in position to receive the pins when the motor shaft 11 is lined up with the reel shaft 7, as in FIG. 2.

The openings 19, forming sockets for the drive pins, may be enlarged at the entrance ends in conical formation to readily guide the pins in place and the pins may have rounded entrance ends.

The motor driven shaft 11 is shown in FIG. 2 as projecting beyond the flange 20 which carries the pins, so as to engage the end of the reel shaft 7 and act as a stop, positioning the motor unit in respect to the reel.

While generally preferred to provide socket openings for the drive pins in the crank of the reel, these may be omitted and the crank be driven by positioning the unit with drive pins disposed over opposite edges of the crank lever 6.

The motor, being of the geared type, can be relatively small and be shaped to be readily held in one hand and with the thumb of that hand positioned to operate the control button 12, while holding the unit pressed lightly against the reel, with drive pins engaged with the crank. This may be entirely a one handed operation, leaving the other hand free for grip on the fishing rod.

While the generally cylindrical form of motor shown is entirely practical, it is considered that the motor may be specially shaped or provided with a hand grip, for most conveniently holding it in the hand and exerting proper pressure to maintain driving engagement with the reel.

This shape or design of the drive unit may be varied, particularly to facilitate the handling of the same, for example, in passing the unit from one person to another in the servicing of several different reels.

While particularly intended for retrieving long lines, it will be appreciated that the motor unit may actually be used for taking in lines with fish hooked thereon.

The invention, it will be seen, provides a power drive without addition of any bulk or weight to the rod or reel, leaving these free and clear to be handled in the usual way. When power is needed however this is instantly available by simply engaging the projecting pins of the power unit with the crank of the reel and pressing the control button.

The motor may be stopped at any time and for any reason whatsoever without disengaging the drive from the reel.

If desired, an electrically operable clutch may be incorporated in the drive system of the motor unit.

Any available power supply may be used. As a further example a portable power pack such as may be carried in the pocket or on a belt on the fisherman may be employed with advantage since such packs are rechargeable and may carry more than enough current for a day of fishing.

In all events the utilization of this power is under complete control of the fisherman at all times.

What is claimed is:

An electric motor drive for a fishing reel, comprising the combination of
   a fishing reel having hand operating means including a spool winding shaft and a hand crank in exposed position on the end of said reel shaft,
   said hand operating means having driven abutments spaced equal distances to opposite sides of the shaft center,
   a small portable electric motor of size and shape to be held in one hand and having a control member positioned for actuation by a finger of the hand holding the motor, said motor having a drive shaft exposed for end-to-end alignment with said reel shaft, driving abutments carried by said motor shaft spaced equal distances to opposite sides of said motor shaft and corresponding in spacing to said abutments on said reel shaft, said driving and driven abutments of the motor and reel respectively extending longitudinally of and parallel with the shafts by which they are carried and thereby engageable and disengageable by direct shaft aligning movements of the motor with respect to the reel and whereby said reel may be manipulated by its hand crank in the usual way with the motor separated from the reel or for retrieving a long line by power operation by simply positioning the motor with the drive shaft in line with the reel shaft and operating the control member to temporarily effect the power operation of the reel.

References Cited in the file of this patent

UNITED STATES PATENTS

| | | |
|---|---|---|
| 2,385,963 | Beard | Oct. 2, 1945 |
| 2,816,535 | Sells | Dec. 17, 1957 |
| 3,077,318 | Du Val | Feb. 12, 1963 |